US009671568B2

(12) United States Patent
Yoshizaki

(10) Patent No.: US 9,671,568 B2
(45) Date of Patent: Jun. 6, 2017

(54) OPTICAL CONNECTOR PLUG WITH SHUTTER

(71) Applicant: HONDA TSUSHIN KOGYO CO., LTD., Tokyo (JP)

(72) Inventor: Tsuyoshi Yoshizaki, Tokyo (JP)

(73) Assignee: HONDA TSUSHIN KOGYO CO., LTD., Tokyo (JP)

( * ) Notice: Subject to any disclaimer, the term of this patent is extended or adjusted under 35 U.S.C. 154(b) by 0 days.

(21) Appl. No.: 14/333,796

(22) Filed: Jul. 17, 2014

(65) Prior Publication Data

US 2015/0055928 A1 Feb. 26, 2015

(30) Foreign Application Priority Data

Aug. 22, 2013 (JP) ................................. 2013-172126

(51) Int. Cl.

*G02B 6/00* (2006.01)
*G02B 6/38* (2006.01)

(Continued)

(52) U.S. Cl.

CPC .......... *G02B 6/3849* (2013.01); *G02B 6/3825* (2013.01); *G02B 2006/4297* (2013.01)

(58) Field of Classification Search

CPC .......... G02B 6/36; G02B 6/38; G02B 6/3825; G02B 6/384; G02B 6/3883; G02B 6/3837;

(Continued)

(56) References Cited

U.S. PATENT DOCUMENTS 6,796,719 B2 * 9/2004 Zhu ...................... G02B 6/3849 385/76
2010/0284655 A1 11/2010 Nakano et al.

(Continued)

FOREIGN PATENT DOCUMENTS

GB 1058886 2/1967
JP 2005-017598 1/2005

(Continued)

OTHER PUBLICATIONS

Extended European Search Report issued Jan. 5, 2015 in corresponding European Patent Application No. 14177452.1.

(Continued)

*Primary Examiner* — Kaveh C Kianni
*Assistant Examiner* — Hung Lam
(74) *Attorney, Agent, or Firm* — Wenderoth, Lind & Ponack, L.L.P.

(57) ABSTRACT

An optical connector plug with a shutter to be fitted to an optical connector adapter includes: a plug frame configured to hold a ferrule; a square cylindrical front housing including a shutter that opens and closes with a movement of the ferrule; a locking housing fixedly and integrally connected to the plug frame and configured to be fitted into and be locked with the optical connector adapter; and a spring that biases the front housing forward. The plug frame is moved forward by a rearward movement of the front housing, a front opening edge portion of the plug frame expands a shutter into a straight shape, and the shutter includes slits straddling over a boundary between a flat portion and a curved portion when light is blocked, and a protrusion formed by a center portion being deformed by the expanded shutter when being fitted is cancelled.

3 Claims, 7 Drawing Sheets

(51) Int. Cl.
*G02B 6/36* (2006.01)
*G02B 6/42* (2006.01)

(58) Field of Classification Search
CPC ... G02B 6/3845; G02B 6/3881; G02B 6/3889
USPC ........................ 385/53, 58, 70, 73, 134, 139
See application file for complete search history.

(56) References Cited

U.S. PATENT DOCUMENTS

| | | | | |
|---|---|---|---|---|
| 2011/0229094 | A1* | 9/2011 | Isenhour | G02B 6/3825 385/92 |
| 2012/0251050 | A1* | 10/2012 | Lin | 385/53 |
| 2013/0071068 | A1* | 3/2013 | Lin | 385/75 |

FOREIGN PATENT DOCUMENTS

| | | |
|---|---|---|
| JP | 2008-175943 | 7/2008 |
| JP | 2010-156831 | 7/2010 |
| JP | 2011-013606 | 1/2011 |

OTHER PUBLICATIONS

Japanese Notice of Reasons for Refusal dispatched Nov. 17, 2015 in corresponding Japanese Patent Application No. 2013-172126 with English translation.

* cited by examiner

OPTICAL CONNECTOR PLUG WITH SHUTTER

BACKGROUND OF THE INVENTION

1. Field of the Invention

The present invention relates to an optical connector plug with a shutter represented by an LC-type plug used for a connecting end of an optical fiber cable.

2. Prior Art

In the prior art, an optical connector plug with a shutter illustrated in FIG. 7A to FIG. 11C, for example, an LC type plug 15 with a shutter described as a representative example includes: a cylindrical plug frame 18 having a ferrule 16 and a resilient member 17 configured to bias the ferrule 16 forward in the interior thereof; a cylindrical front housing 19 surrounding the plug frame 18 so as to be in free sliding contact with an outside thereof; one light-shielding plate (shutter) 22 having a curved shape, fixed at one end portion thereof to an inner wall of the front housing 19, and configured to block light at a position in front of the ferrule 16; and a locking housing 20 configured to be fitted from the rear of the plug frame 18 as described in JP-A-2011-13606.

With the LC-type plug with a shutter 15, the light shielding plate 22 blocks a laser from the ferrule 16 to protect eyes or the like in a non-connected state, the light-shielding plate 22 comes into abutment with an opening edge portion of the plug frame 18 by a rearward movement of the front housing 19 in a connected state and is extended from a curved shape to a straight shape, and the ferrule 16 projects from an opening end of the front housing 19 moved rearward. Accordingly, the ferrule 16 on the LC type plug 15 with a shutter side and a ferrule on an LC type adapter 24 side, which is a connection counterpart (see FIGS. 6A and 6B) are connected.

However, since the light-shielding plate 22 in the LC type plug 15, which is an example of the optical connector plug with a shutter of the prior art, is brought into a state of being sandwiched between the plug frame 18 and the front housing 19 when being fitted to the LC type adapter 24 and hence is stored in a state of being subjected to a load, a center portion of the light-shielding plate 22 is deformed and protruded.

Accordingly, a retaining square hole 22*c* provided on the light-shielding plate 22 illustrated in FIGS. 10A and 10B may climb over a central projection 19*c* for locking the light-shielding plate on a bottom portion of the front housing 19 illustrated in FIGS. 11B and 11C, so that the light shielding plate 22 may come off from the front housing 19 during an opening and closing action repeated by the front housing 19.

SUMMARY OF THE INVENTION

An optical connector plug with a shutter of the invention is proposed for solving the above-described problems.

In order to solve the above-described problem, an optical connector plug with a shutter of the invention is an LC type plug to be fitted to an optical connector adapter, including: a plug frame configured to hold a ferrule; a square cylindrical front housing arranged so as to be slidable on the plug frame and including a shutter configured to open and close in association with a movement of the ferrule at a distal end side opening; a locking housing fixedly and integrally connected to the plug frame configured to be fitted into and be locked with the optical connector adapter; and a spring configured to bias the front housing forward, wherein the plug frame relatively moves forward by a rearward movement of the front housing so that a front opening edge portion of the plug frame expands the shutter which is curved on an optical axis of the distal end side opening of the front housing and blocking light into a straight shape, and the shutter includes a slit so as to straddle over a boundary portion between a flat portion and a curved portion in a state in which light is blocked, and a protrusion formed by a center portion being deformed in a state in which the shutter is expanded when being fitted into the optical connector adapter is cancelled.

A retaining mechanism which retains the shutter from coming off the front housing includes a retaining hole formed at a center of a flat portion of the shutter, locking protrusions formed at both rear ends of the flat portion, a locking projection to be fitted to the retaining hole formed in the front housing, and locking portions configured to lock the locking protrusions.

According to the optical connector plug with a shutter of the invention, the slit is formed on the shutter in a state in which the shutter is expanded when the adapter is connected, so that the center portion is not deformed and is prevented from protruding even when being sandwiched between the front housing and the plug frame. Accordingly, the probability that the square hole for retaining the shutter climbs over the retaining projection of the front housing, and the shutter comes off is eliminated.

In addition, since the number of positions where the locking portions are provided in the retaining mechanism is increased from one in the prior art to three, and the shutter is reliably fixed to the front housing, a superior advantage that the retaining function is improved is achieved.

DETAILED DESCRIPTION OF THE PREFERRED EMBODIMENTS

Figure 3A:
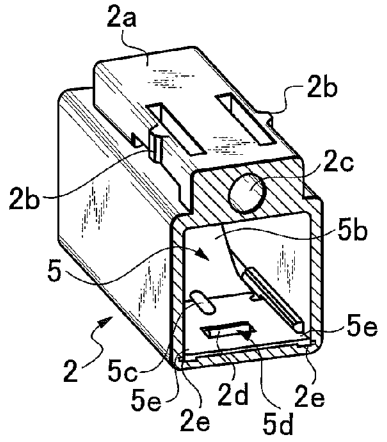
FIGS. 3A and 3B are a perspective view illustrating a front housing in the optical connector plug with a shutter, and a perspective view illustrating a shutter.
Figure 3B:
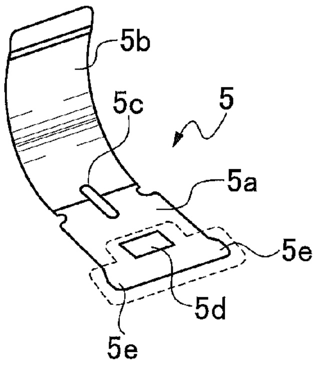

An optical connector plug 1 with a shutter according to the invention is characterized in that a shutter 5 as a light-shielding plate includes slits 5*c* added thereto so as to straddle a flat portion 5*a* and a curved portion 5*b* so that a center portion of the shutter is not deformed when being expanded into a straight shape at the time of being fitted and connected as illustrated in FIGS. 3A and 3B.

Example 1

Figure 6A:
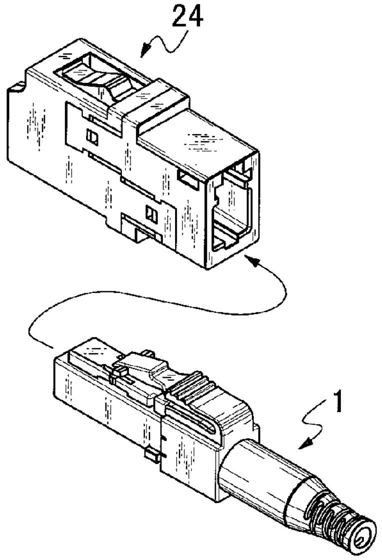
FIGS. 6A and 6B are a perspective view illustrating a state of connecting the optical connector plug to the LC type adapter, and a perspective view illustrating a state after the connection.
Figure 6B:
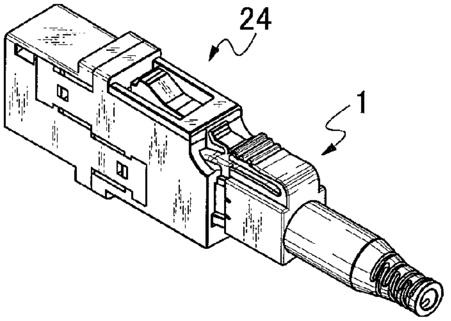
Figure 7A:
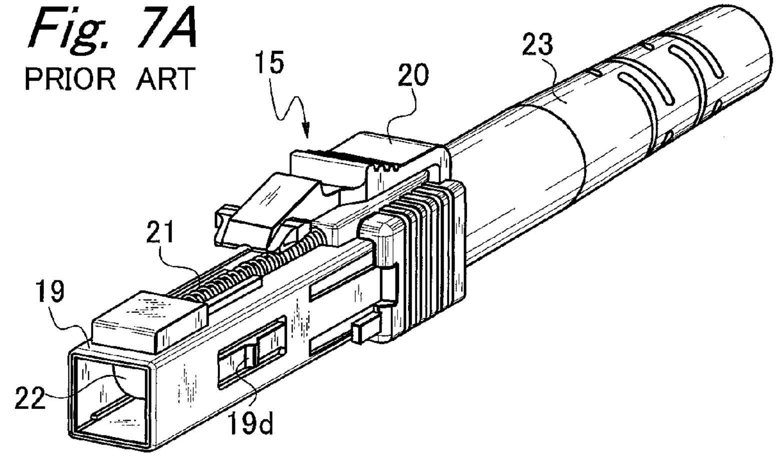
FIGS. 7A and 7B are a perspective view illustrating an LC type plug with a shutter, which is an optical connector adapter with a shutter of the prior art, and a perspective view illustrating a state in which the front housing is removed from the LC type plug with a shutter.
Figure 7B:
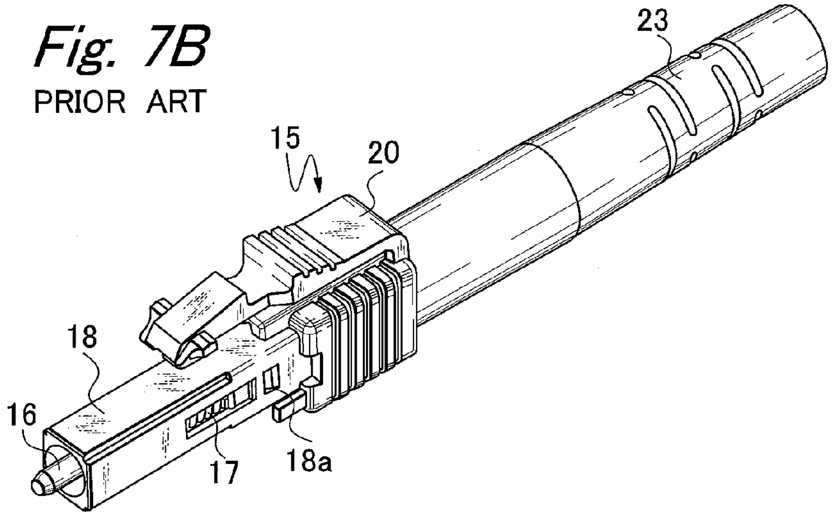

The optical connector plug 1 with a shutter of the invention is fitted into an LC type adapter 24 as an optical connector adapter as illustrated in FIGS. 6A and 6B. The optical connector plug 1 roughly includes, as illustrated in FIGS. 1A to 2B, a slidable front housing 2 being a cylindrical body having a square cylindrical shape, provided with the shutter 5 at a front opening, and being biased constantly forward by a spring 6, a cylindrical locking housing 3 configured to store a rear portion of the front housing 2 being retracted, and engage the LC type adapter 24 as a connection counterpart, a cylindrical plug frame 4 to which a rear portion of the locking housing 3 is fixedly connected and configured to support the front housing 2 so as to be slidable, a ferrule 16 held in the interior of the plug frame 4 and configured to be biased forward by a spring 17 which obtains a reaction force from the locking housing 3, a boot 23 configured to be mounted on the rear portion of the locking housing 3, and a swage ring 23*a*.

Figure 1A:
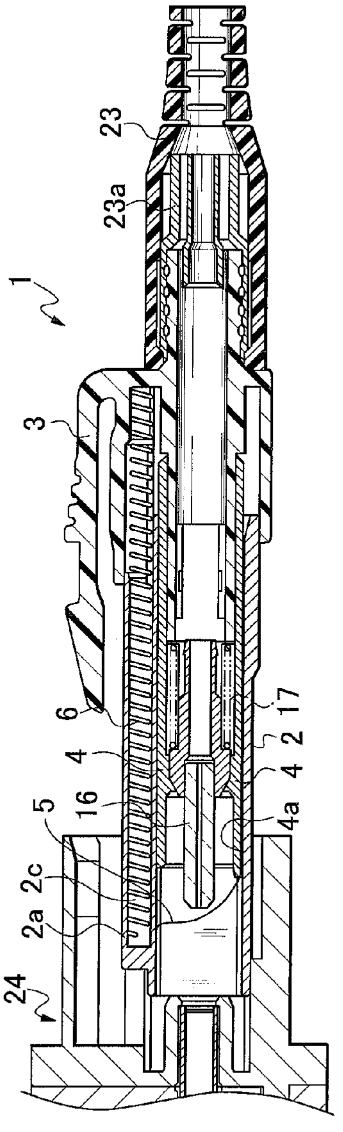
FIGS. 1A and 1B are a partly vertical cross-sectional view illustrating a state in the course of connecting an optical connector plug with a shutter of the invention to an LC type adapter 24, which is an optical connector adapter, and a vertical cross-sectional view illustrating a state in which the connection is completed part thereof in an enlarged scale.
Figure 2A:
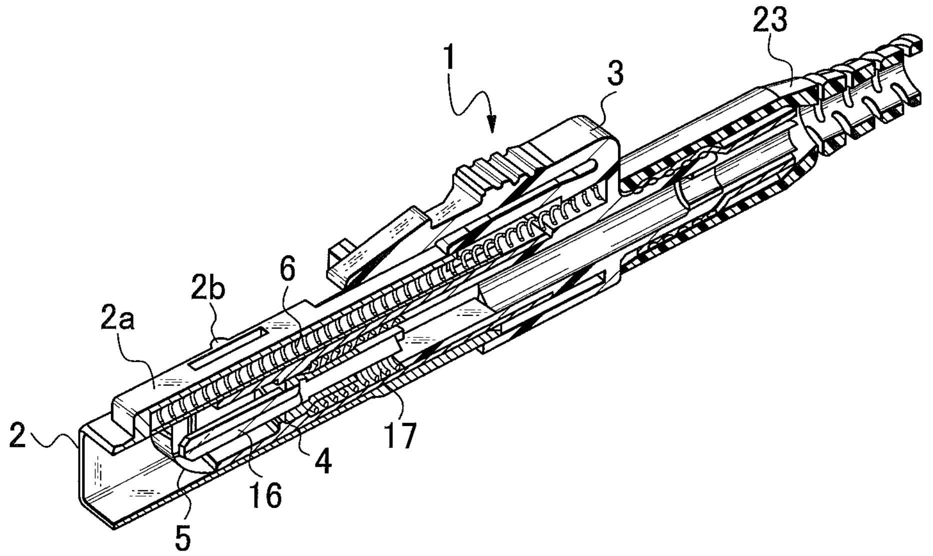
FIGS. 2A and 2B are a semi-cross-sectional perspective view illustrating a state in which the optical connector plug with a shutter is not connected, and a semi-cross-sectional view illustrating a connected state.

In the optical connector plug 1 with a shutter, as illustrated in FIGS. 1A and 2A, projections 2*b* provided on upper side walls of the front housing 2 abut against edge portions of an opening of the LC type adapter 24 when being fitted to the LC type adapter 24, so that the front housing 2 having the projections 2*b* formed integrally on an outer peripheral portion is moved rearward.

Figure 1B:
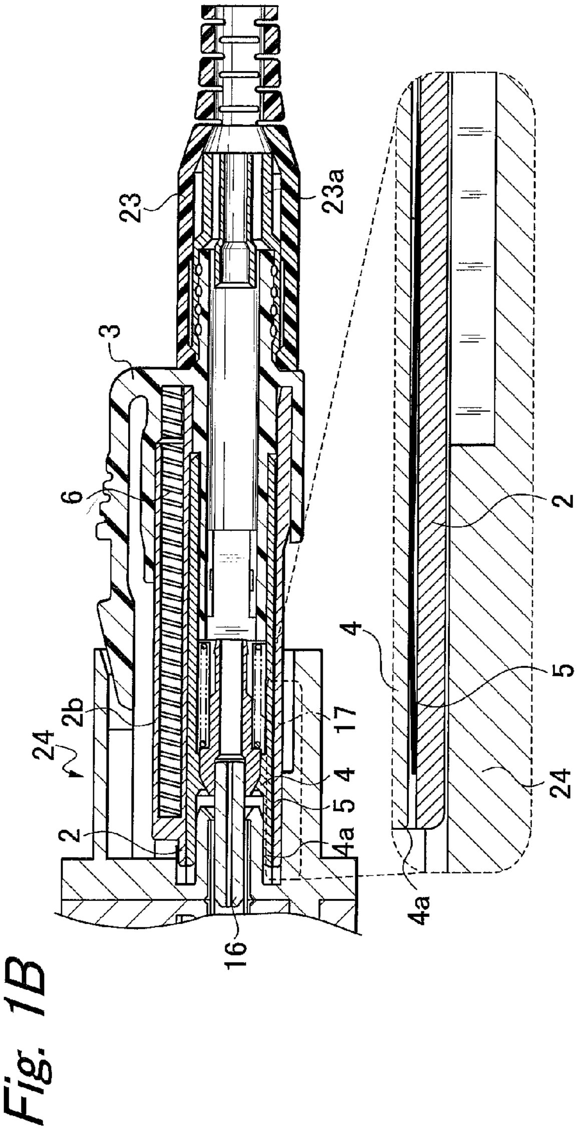
Figure 2B:
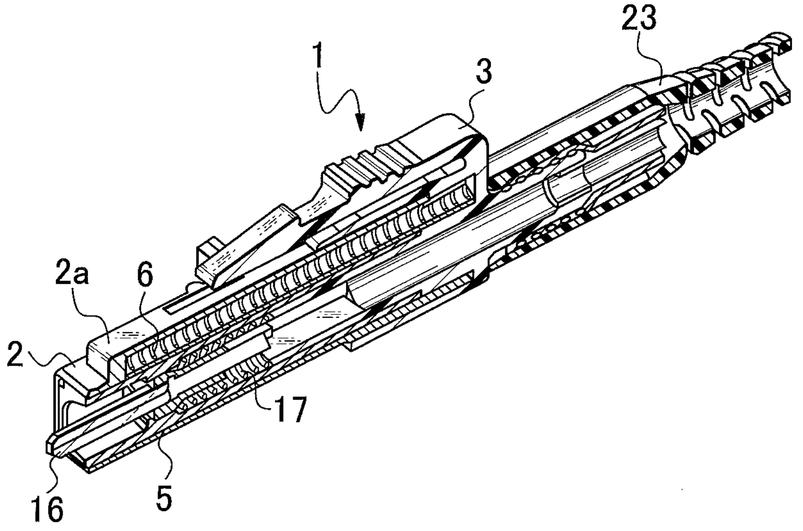

Accordingly, as illustrated in FIGS. 1B and 2B, the plug frame 4 which slidably supports the front housing 2 moves forward relatively with each other. Subsequently, an edge portion of the opening located on a front portion of the plug frame 4 causes the shutter 5, which is provided on an opening side of the front housing 2 and is curved on an optical axis so as to block light, to deploy into a straight shape. In this manner, a distal end portion of the ferrule 16 included in the plug frame 4 projects outward from the opening of the front housing 2.

When the optical connector plug 1 with a shutter is fitted into the LC type adapter 24 as illustrated in FIGS. 1A, 1B, and 4, the front housing 2 retracts as illustrated in FIGS. 2A and 2B, and hence the plug frame 4 moves relatively forward and an edge portion of an opening of the plug frame 4 abuts against and pushes the shutter 5, so that the shutter 5 is expanded from the curved shape to the straight shape.

At this time, in order to prevent the curved portion 5*b* of the shutter 5 from being deformed, the slits 5*c* configured to cancel a protrusion of a center portion of the shutter in an expanded state when being fitted due to deformation are formed so as to straddle a boundary portion between the flat portion 5*a* and the curved portion 5*b* in a state in which light is blocked by the shutter 5 as illustrated in FIG. 3A.

In addition, as a measure to ensure retention of the shutter 5, retention of the shutter 5 at the flat portion 5*a* is achieved by a retaining hole 5*d* provided at a center of the flat portion 5*a* to be engaged with a locking projection 2*d* of the front housing 2 and locking protrusions 5*e* and 5*e* formed at both left and right end portions of a rear end portion of the flat portion 5*a* to be locked by locking portions 2*e* and 2*e* of the front housing 2 as illustrated in FIGS. 3A, 3B, 4A, and 4B.

Figure 8A:
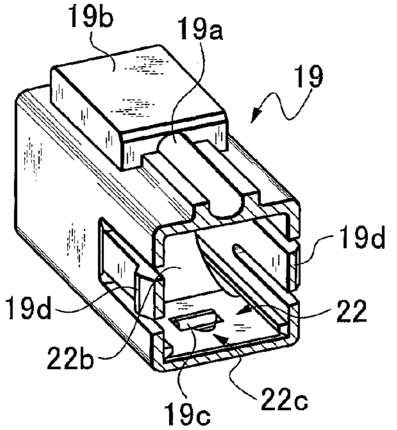
FIGS. 8A and 8B are a perspective view illustrating a front housing in the LC type plug with a shutter, and a perspective view illustrating a shutter.
Figure 8B:
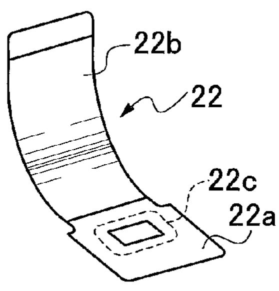
Figure 9A:
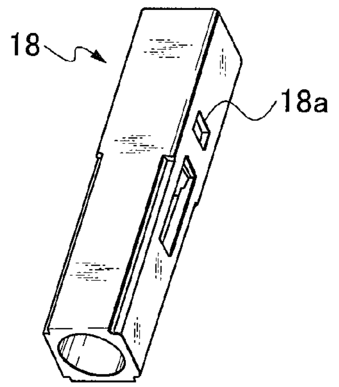
FIG. 9A is a perspective view illustrating a plug frame of the LC type plug with a shutter.
Figure 9B:
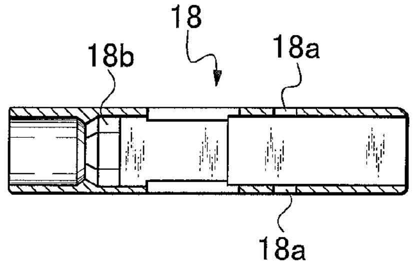
FIG. 9B is a cross-sectional plan view illustrating the plug frame of the LC type plug with a shutter.
Figure 9D:
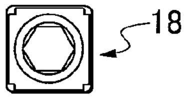
FIG. 9D is a front view of the plug frame illustrating the LC type plug with a shutter.
Figure 9C:
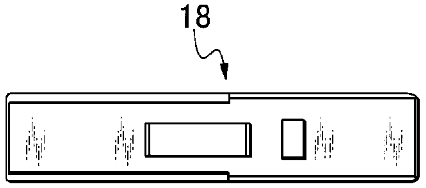
FIG. 9C is a side view of the plug frame illustrating the LC type plug with a shutter.
Figure 9E:
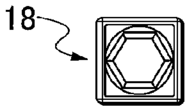
FIG. 9E is a rear view of the plug frame illustrating the LC type plug with a shutter.
Figure 10A:
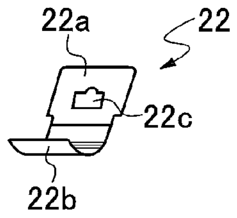
FIGS. 10A and 10B are a perspective view and a plan view illustrating the shutter of the LC type plug with a shutter, respectively.
Figure 10B:
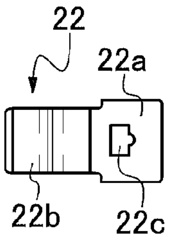

When comparing with a shutter 22 of the prior art illustrated in FIGS. 8A and 8B, the shutter 5 of this embodiment is retained with respect to the front housing 2 at three positions, namely by the retaining hole 5*d* and the locking protrusions 5*e* and 5*e* in contrast to a retaining mechanism of the prior art in which the shutter is retained only at one position at a retaining hole 22*c* (see FIGS. 3A and 3B).

Figure 4A:
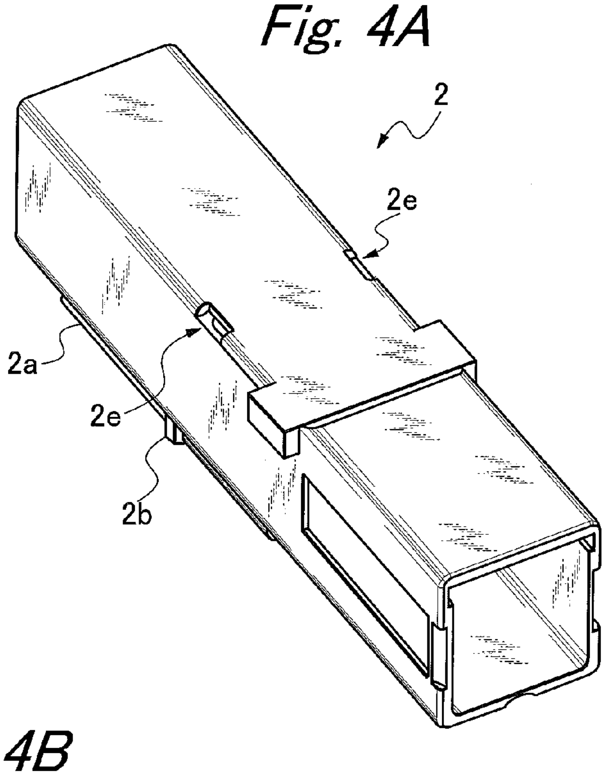
FIGS. 4A and 4B are a perspective view and a bottom view of the front housing viewed from a back side, respectively.
Figure 4B:
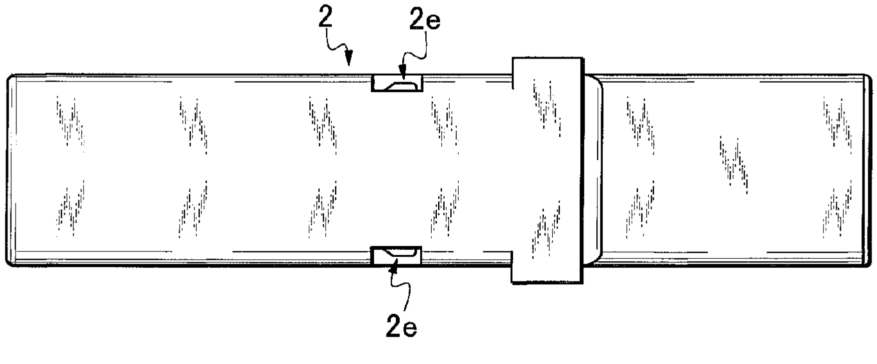
Figure 11A:
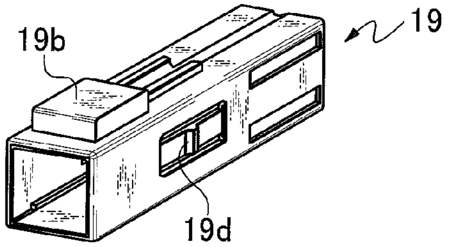
FIGS. 11A, 11B, and 11C are a perspective view, a cross-sectional plan view, and a semi-cross-sectional perspective view illustrating a front housing in the LC type plug with a shutter.
Figure 11B:
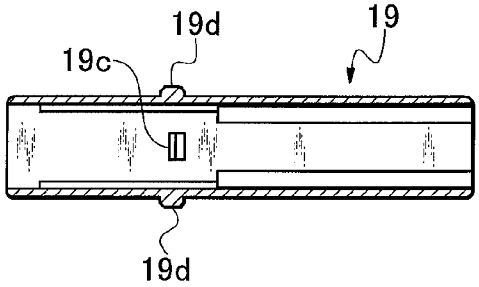
Figure 11C:
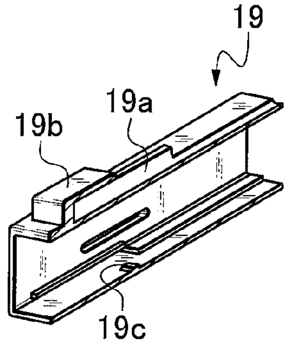

A front housing 19 of the prior art is provided with a locking projection 19*c* at one position, namely, at a center of a bottom portion as illustrated in FIGS. 8A and 11B as the retaining mechanism of the shutter 22*c*. In contrast, the front housing 2 of the optical connector plug 1 with a shutter of the invention is provided with the locking projection 2*d* at one position and the locking portions 2*e* at two positions as illustrated in FIGS. 3A, 4A, and 4B.

In this manner, the optical connector plug 1 with a shutter of the invention is configured to prevent the deformation of the shutter 5 when being fitted by the slits 5*c* and is provided with the locking protrusions 5*e* at two positions added thereto as the measure to ensure retention of the shutter against deformation. Therefore, deformation of the shutter when the optical connector plug 1 is fitted into the LC type adapter is restrained, and retention of the shutter is ensured.

Example 2

Figure 5:
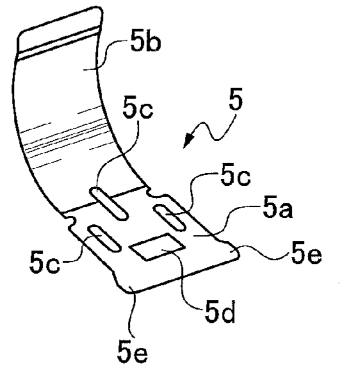
FIG. 5 is a perspective view illustrating another example of shutter.

FIG. 5 illustrates the shutter 5 of the optical connector plug 1 with a shutter of Example 2 of the invention. The shutter 5 includes the slits 5*c* at three positions. Although the number and the size of the slits 5*c* are not specifically limited, deformation of the shutter may be prevented by adjusting the number and the size optimally as needed.

INDUSTRIAL APPLICABILITY

The optical connector plug with a shutter of the invention is applied as a plug to be fitted to an optical connector adapter such as the LC type adapter, and may be widely applied to the plug or the like for optical communication having a curved one plate of shutter.

What is claimed is:

1. An optical connector plug with a shutter configured to be fitted to an optical connector adapter, the optical connector plug comprising:

a plug frame configured to hold a ferrule;

a front housing having a hollow quadratic shape, the front housing being arranged so as to be slidable on the plug frame and including a shutter having a flat portion and curved portion with a boundary portion located therebetween, the shutter being configured to open and close in association with a movement of the ferrule at a distal end side opening of the front housing, the flat portion of the shutter being fixed and retained, in surface-to-surface contact, to an inner bottom of the front housing with a retaining mechanism, the flat portion being situated at a rear of the shutter, the curved portion being situated at a front of the shutter, and the boundary portion being situated between the flat portion and the curved portion;

a locking housing fixedly and integrally connected to the plug frame and configured to be fitted into and locked with the optical connector adapter; and a spring configured to bias the front housing forward, wherein the plug frame relatively moves forward by a rearward movement of the front housing so that a front opening edge portion of the plug frame expands the shutter, which is biased to block an optical axis of the distal end side opening of the front housing, into a straight shape such that the optical axis of the distal end side opening is not blocked, and the shutter includes a slit extending from the flat portion across the boundary portion to the curved portion in order to prevent a center portion of the shutter from being deformed to have a protrusion shape in a state in which the shutter is expanded when the optical connector plug is fitted into the optical connector adapter.

2. The optical connector plug with a shutter according to claim 1, wherein the retaining mechanism is configured to retain the shutter in the front housing and prevents the shutter from detaching from the front housing, and the retaining mechanism includes a retaining hole formed at a center of the flat portion of the shutter, locking protrusions formed at both rear ends of the flat portion, a locking projection to be fitted to the retaining hole formed in the front housing, and locking portions configured to lock the locking protrusions.

3. The optical connector plug with a shutter according to claim 2, wherein the locking portions lock the locking protrusions to prevent separation of the shutter from the front housing in a direction away from a surface of the front housing on which the shutter is retained.

* * * * *